(12) United States Patent
Tanaka et al.

(10) Patent No.: US 7,006,146 B1
(45) Date of Patent: Feb. 28, 2006

(54) DIGITAL STILL CAMERA CAPABLE OF TELECOMMUNICATION AND MODIFICATION OF ELECTROMAGNETIC SIGNAL INTO DIGITAL ELECTRONIC SIGNAL

(75) Inventors: Masahide Tanaka, Osaka (JP); Katsutoshi Ito, Tokyo (JP)

(73) Assignee: Samsung Techwin Co., Ltd., Suwon (KR)

( * ) Notice: Subject to any disclaimer, the term of this patent is extended or adjusted under 35 U.S.C. 154(b) by 0 days.

(21) Appl. No.: 09/025,862

(22) Filed: Feb. 19, 1998

(30) Foreign Application Priority Data

Jun. 30, 1997 (KR) ............................................ 97-29444

(51) Int. Cl.
*H04N 5/225* (2006.01)
*H04N 7/14* (2006.01)

(52) U.S. Cl. ................. 348/376; 348/14.02; 348/14.12; 348/231.4; 455/556

(58) Field of Classification Search .............. 348/14.01, 348/14.02, 14.03, 14.04, 14.08, 14.12–14.14, 348/207, 211–213, 222, 333.01, 333.02, 373–375, 348/552; 358/402, 403, 906, 909.1; 455/556, 455/566; 345/764, 784
See application file for complete search history.

(56) References Cited

U.S. PATENT DOCUMENTS

| 5,479,206 | A |   | 12/1995 | Ueno et al. ................. 348/211 |
| 5,491,507 | A | * | 2/1996  | Umezawa ................ 348/14.02 |
| 5,510,829 | A | * | 4/1996  | Sugiyama ................ 348/14.01 |
| 5,530,473 | A | * | 6/1996  | Sakai .......................... 348/243 |
| 5,541,656 | A | * | 7/1996  | Kare ..................... 348/333.02 |
| 5,584,070 | A |   | 12/1996 | Harris et al. |
| 5,612,732 | A | * | 3/1997  | Yuyama ................... 348/14.01 |
| 5,719,936 | A | * | 2/1998  | Hillenmayer ............... 379/447 |
| 5,724,155 | A | * | 3/1998  | Saito .......................... 358/402 |
| 5,760,848 | A | * | 6/1998  | Cho .......................... 348/839 |
| 5,825,408 | A | * | 10/1998 | Yuyama ................... 348/14.01 |

(Continued)

FOREIGN PATENT DOCUMENTS

| CN | 2253892 Y   |   | 5/1997  |
| DE | 19528424 A1 |   | 8/1995  |
| JP | 6-133081    |   | 5/1994  |
| JP | 6-268582    |   | 9/1994  |
| JP | 7-121147    |   | 5/1995  |
| JP | 8-294030    | * | 11/1996 |
| JP | 8-2904030   | * | 11/1996 |

OTHER PUBLICATIONS

"Digital multimedia, simply genius" in: Brochure "The new PowerShot 600" of the company Canon Deutschland GmbH, Postfach 528, D–47705 Krefeld, 1996, received at the Systems, Munich 1996.

HTML file: "Your personal picture of CeBIT 97, taken with the Siemens Pictophonc, Sicmens PN KE TI, Siemens AG, Hofmannstr. 51, D–81359, three pages, contained on 3.5" floppy disc CEBIT Mar. 1997.

*Primary Examiner*—Tuan Ho
*Assistant Examiner*—Justin Misleh
(74) *Attorney, Agent, or Firm*—McGuireWoods LLP (57) ABSTRACT

A digital still camera capable of telecommunication includes a device which converts an optical image into a digital electromagnetic signal indicative of a still image, a receiver which receives an electromagnetic signal generated in accordance with a wireless telephone system, a modifying unit which modifies the electromagnetic signal into a digital electronic signal indicative of a still image, and a displaying device which alternatively displays a still image on the basis of the digital electronic signal from the converting device or from the modifying unit.

20 Claims, 3 Drawing Sheets

U.S. PATENT DOCUMENTS

| | | | | |
|---|---|---|---|---|
| 5,845,166 A | * | 12/1998 | Fellegara | 348/64 |
| 6,009,336 A | * | 12/1999 | Harris | 455/566 |
| 6,037,937 A | * | 3/2000 | Beaton | 345/764 |
| 6,073,034 A | * | 6/2000 | Jacobsen et al. | 455/566 |
| 6,204,877 B1 | * | 3/2001 | Kiyokawa | 348/211.3 |
| 6,226,449 B1 | * | 5/2001 | Inoue | 348/211 |
| 6,278,884 B1 | * | 8/2001 | Kim | 348/14.02 |
| 6,392,697 B1 | * | 5/2002 | Tanaka et al. | 348/220.1 |
| 6,564,070 B1 | * | 5/2003 | Nagamine et al. | 455/556.1 |

* cited by examiner

DIGITAL STILL CAMERA CAPABLE OF TELECOMMUNICATION AND MODIFICATION OF ELECTROMAGNETIC SIGNAL INTO DIGITAL ELECTRONIC SIGNAL

BACKGROUND OF THE INVENTION (a) Field of the Invention

The present invention relates to a digital still camera which converts an optical image into a digital electronic signal representative of the image and stores the digital electronic signal, and more particularly to a still camera capable of communicating to a remote site by means of a wireless telephone system.

(b) Description of the Related Art

In the field of digital still cameras, various types of communication of digital electronic image signals have been proposed. One of the typical proposals is to transmit the digital electronic image signal to a remote device, such as a computer, by connecting a digital still camera to a wireless telephone through a MODEM, and transmitting the signal to the remote device connected to a telephone line.

Japanese Laid Open Patent Application Nos. 6-133081 and 6-268582 disclose a digital still camera and a wireless telephone contained in a single housing. The purpose of combining the digital still camera and the wireless telephone in a single housing is to conserve memory to store the digital electronic image signals. In other words, the digital electronic image signals are transmitted from the digital still camera to a computer at a remote site with a large memory.

Such digital electronic image signals otherwise have to be stored in a memory device included in the digital still camera itself. The devices disclosed in Japanese Laid Open Patent Application Nos. 6-133081 and 6-268582 transmit image information taken by a digital still camera to a computer at a remote site, but have disadvantages because they cannot receive image information from a remote site. In addition, the devices are expensive and inconvenient because they require a large memory and require a long time to transmit image data either in a regular format or in a compressed format.

SUMMARY OF THE INVENTION

One object of the present invention is to provide a digital still camera including in a single housing a wireless telephone, which can receive and display a digital electronic image signal generated by another digital still camera. The digital still camera of the present invention receives digital electronic image signals generated by another digital still camera of a remote site without a large memory.

Another object of the present invention is to provide a digital still camera that can receive an audio and image signals simultaneously.

Another object of the present invention is to provide a digital still camera capable of telecommunication, with which a user can not only talk in an ordinary manner, but also may view the displayed still image while talking.

A further object of the present invention is to provide a digital still camera that can communicate both audio and image signals at the same time.

Another object of the present invention is to provide a digital camera that can communicate with various types of telephones including a standard one that cannot receive an image signal.

Another object of the present invention is to provide a digital still camera that can transfer audio and image signals to the same type of digital still camera in a short period of time.

Another object of the present invention is to provide a digital still camera that can communicate with various types of remote devices including astandard computer.

In order to attain these objects, the digital still camera of present invention includes:

a converting device which converts an optical image into digital electronic image signals;

a receiver which receives an electromagnetic signal generated in accordance with a wireless telephone system;

a modifying unit which modifies the electromagnetic signal into a digital electronic still image signal; and a device which alternatively displays a still image on the basis of the digital electronic signal from the converting device or from the modifying unit.

Other objects and various advantages according to the present invention will be better understood by means of the following detailed descriptions of the preferred embodiment in conjunction with the attached drawing.

BRIEF DESCRIPTION OF THE DRAWINGS

The above object and feature of the present invention will be apparent from the following description of the preferred embodiment with reference to the accompanying drawings.

DETAILED DESCRIPTION OF THE PREFERRED EMBODIMENTS

The above objects and features of the present invention will be apparent from the following description of the preferred embodiments with reference to the accompanying drawings.

Figure 1:
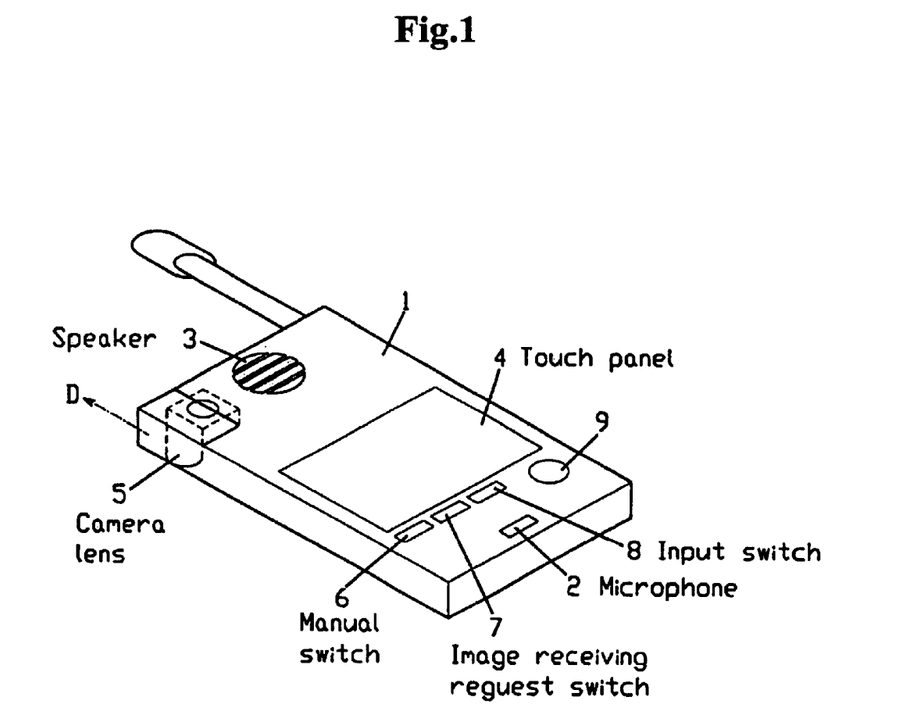
FIG. 1 is a perspective view of an embodiment of a digital still camera according to the present invention.

As shown in FIG. 1, a digital still camera according to an embodiment of the present invention includes a microphone 2 and a speaker 3 in a single housing.

Further, the digital still camera includes a display device (color liquid crystal display) 4 of a reflection type without back light illumination to save power, which displays a color image of 60,000 pixels. The display device 4 functions as a touch panel of dial buttons for a digital phone.

A camera lens 5 can rotate and is normally aimed in a direction indicated by arrow D that is not in the line of sight of the users who observe the display panel 4. However, the lens 5 can rotate so that it can be in the line of sight of the users when they watch the display panel 4. The lens is illustrated by the broken lines in FIG. 1.

The speaker 3 and the microphone 2 can function in a close mode or in a remote mode. In a close mode, the users put their ears and mouths close to the speaker 3 and microphone 2. On the other hand, in a remote mode, the users can put their ears and mouth relatively remote from the speaker and the microphone.

A manual switch 6 turns on the display device 4 to display a still image. The speaker 3 and the microphone 2 automatically change into the remote mode when the manual switch 6 turns on the display device 4.

An image receiving request switch 7 requests the remote device to transfer an image. An input switch 8 activates a touch panel on the display 4, which can accept an image input by pen. The button 9 is a shutter release button.

Figure 2:
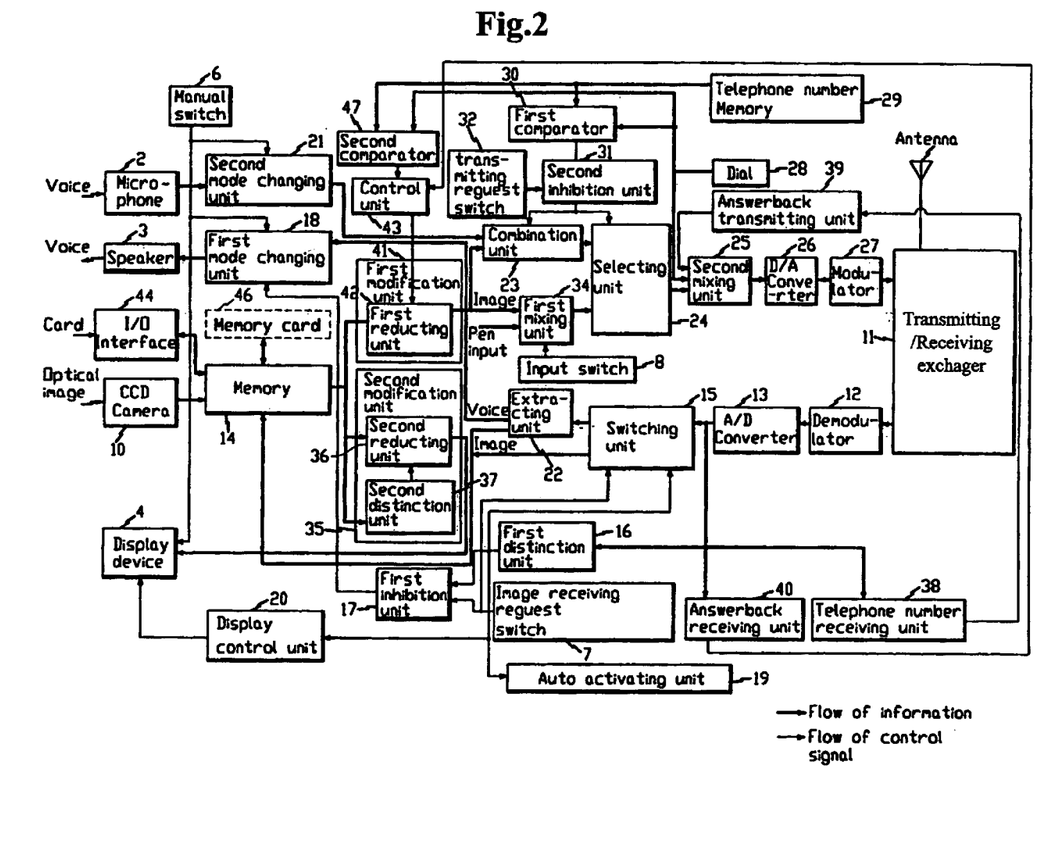
FIG. 2 is a block diagram showing an embodiment of the digital still camera according to the present invention.

In FIG. 2, a thick line represents the information flow and a thin line represents the flow of control signals.

In more detail, the digital still camera according to an embodiment of the present invention includes a CCD camera 10 for converting an optical image into digital electronic image signals;

a transmitting/receiving exchanger 11 for receiving or transmitting an electromagnetic signals generated in accordance with a wireless telephone system;

a demodulator 12 for demodulating the received electromagnetic signals, which is connected to the output of the transmitting/receiving exchanger 11;

an A/D converter 13 for converting the electromagnetic signals into digital electronic still image signals, which is connected to the output of the demodulation unit 12;

a switching unit 15 connected to the output of the AID converter 13;

an extracting unit 22 for extracting still image signal components and audio signal components from the digital electronic signals, which is connected to the output of the switching unit 15;

a memory 14 for storing the still image signal from the extracting unit 22 or the digital still image signal from the CCD camera 10;

a speaker 3 for generating audio signals in response to the electromagnetic signals of the wireless telephone system received by the transmitting/receiving exchanger 11 and the demodulator 12;

a first mode changing unit 18 for activating the speaker 3 in a close or remote mode;

a first distinction unit 16 for detecting an image signal from the digital electronic signal converted by AID converter 13 and automatically controlling the switching unit 15 from a first mode to a second mode;

a display control unit 20 for controlling the display device 4 to display whether the received electromagnetic signal contains a still image signal or audio signal, which is connected to the output of the first distinction unit 16;

a first inhibition unit 17 for making the first mode changing unit 18 "OFF" to restrain the speaker 3 from generating a voice signal in the second mode, which is connected to the output of the first distinction unit 16;

an image receiving request switch 7 for operating the switching unit 15 from a first mode to a second mode, which is connected to the input of the switching unit 15;

a telephone number receiving unit 38 for receiving a telephone number signal generated in accordance with the wireless phone system from another remote device, such as another digital still camera or a handy phone, which is connected to the output of the A/D converter 13;

an answer back receiving unit 40 for receiving a second answer back signal generated in accordance with the wireless phone system from another remote device, which is connected to the output of the A/D converter 13; and an auto activating unit 19 connected to the output of the first distinction unit 16.

In addition to the above-mentioned construction for receiving an electromagnetic signal from the remote device and outputting a corresponding audio signal and displaying a corresponding image, the digital still camera according to an embodiment of the present invention further includes:

a microphone 2 for converting a voice into an electronic audio signal;

a second mode changing unit 21 for activating the microphone 2 in a first/second mode;

a first modification unit 41 for forming a still image signal of a less number of pixel to be contained in a still image signal from the memory 14;

a combination unit 23 for combining the electronic audio signal from the second mode changing unit 21 and the still image signal from the first modification unit 41;

a first mixing unit 34 for mixing the still image signal from the first modification unit 41 and an input signal by pen when an input switch 8 is activated "ON";

a selecting unit 24 for outputting alternatively one of the signals from the combination unit 23 and from the first mixing unit 34;

a dial 28 for dialing a telephone number designating another remote device, such as a type of a touch panel;

a telephone number memory 29 for storing many telephone numbers;

a first comparator 30 and second comparator 47 for comparing the telephone number dialed by the dial 28 with the specific telephone number stored in memory 29;

a second inhibition unit 31 for inhibiting the combination unit 23 from combining the electronic audio signal from the second mode changing unit 21 and the still image signal from the first modification unit 41 when the dialed telephone number designating another remote device is the specific telephone number stored in memory 29;

a control unit 43 for controlling the first modification unit 41, which is connected to the second comparator 47;

a second modification unit 35 for judging whether the still image signal from the memory 14 is a first type or a second type so that it can determine whether to reduce the number of pixels to output in the display 4;

an answer back transmitting unit 39 for generating a first answer back signal indicating the receipt of an electromagnetic signal transmitted from another remote device, which is connected to the output of the telephone number receiving unit 38;

a second mixing unit 25 for mixing signals from the selecting unit 24, the answer back transmitting unit 39 and the dial 28;

a D/A converter 26 for converting the signal from the second mixing unit 25 into an analog signal;

a modulation unit 27 for modulating the signal from the D/A converter 26 and outputting it to the transmitting/receiving exchanger 11; and an image transmitting request switch 32 connected to the input of the second inhibition unit 31.

The first modification unit 41 includes a first reducing unit 42 for reducing the number of pixels of the still image signal from the memory 14. The second modification unit 35 includes a second distinction unit 37 for judging whether the still image signal from the memory 14 is a first type or a second type and a second reducing unit 36 for reducing the number of pixels of the still image signal from the memory 14 and outputting the resultant image to the display device 4.

The digital still camera according to an embodiment of the present invention further includes a memory card 46 and an input/output interface unit 44 for outputting an image signal from such a memory card 46 to the memory 14.

The transmitting/receiving exchanger 11 is able to amplify the transmitted or received electromagnetic signals as well as to transmit those signals.

The input/output interface 44 serves as a means for extracting the digital electromagnetic signal from the memory 14, and includes means for connecting itself to an external device.

The memory card 46 also serves as a means for extracting the digital electronic signal from the memory 14, and is detachably inserted into the digital still camera. In order words, a slot for memory card 46 serves as a means for removing the digital still image memory from the digital still camera.

Figure 3:
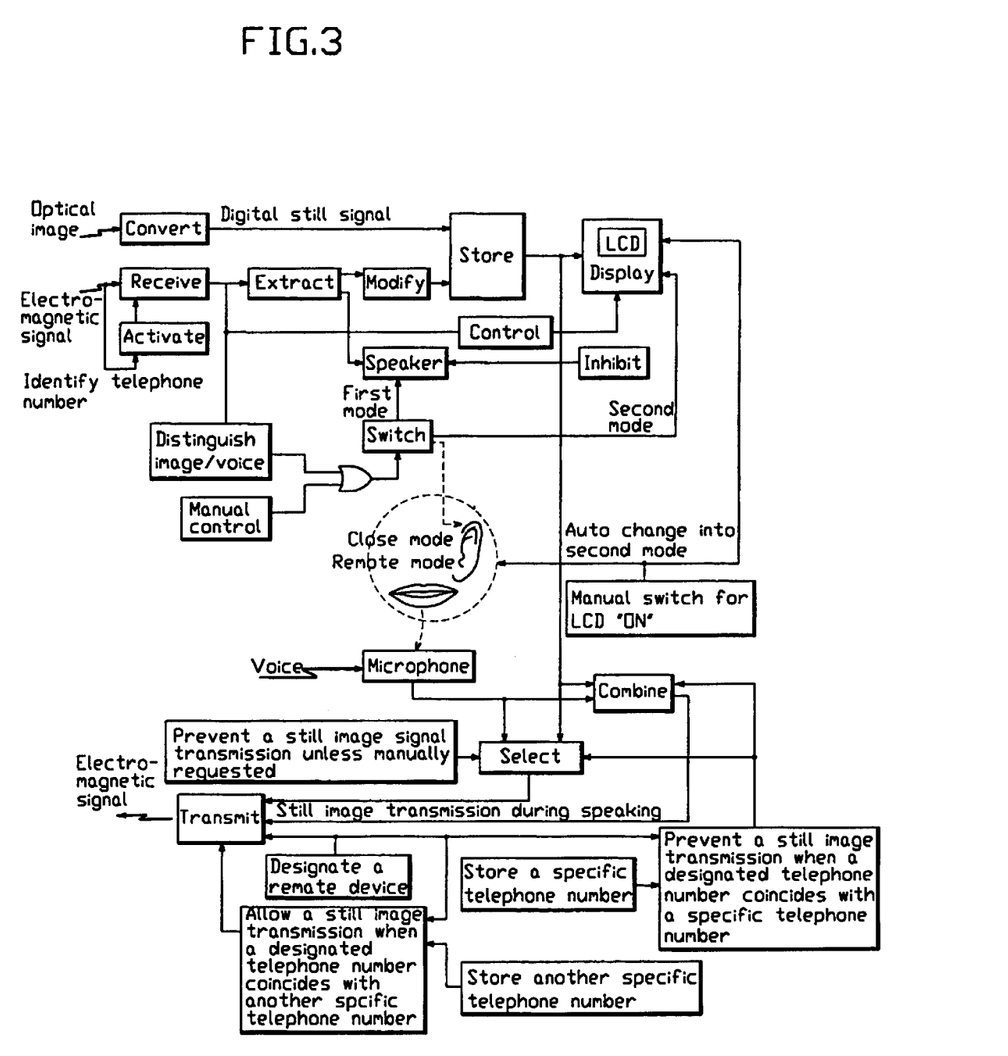
FIG. 3 is a block diagram showing a transmitting/receiving state of the digital still camera according to an embodiment of the present invention.

The digital still camera according to the embodiment of the present invention, as shown in FIG. 3, receives and displays a still image signal and an audio signal as an electromagnetic signal generated in accordance with a wireless telephone system from a remote device.

Also, the digital still camera according to the embodiment of the present invention converts an optical image into an electronic still image signal and transmits the electronic still image signal to a remote device such as another digital still camera. At this time the digital still camera does not transmit a still image signal when a telephone number designating the remote device matches a specific telephone number stored in memory, and transmits a still image signal when a telephone number designating the remote device does not match a specific telephone number stored in memory.

The above-mentioned operation of the digital still camera according to embodiments of the present invention will be explained in detail referring to FIG. 2.

First, the following is an explanation of how an electromagnetic signal containing a still image signal generated in accordance with a wireless phone system from another remote device is received and displayed, and how an electromagnetic signal containing an audio signal generated in accordance with a wireless phone system from another remote device is received and outputted.

Referring to FIGS. 2 and 3, an antenna of the digital still camera of the present invention receives an electromagnetic signal from a remote device, such as another digital still camera, and a transmitting/receiving exchanger 11 changes to a receiving mode and outputs the received electromagnetic signal to the demodulator 12.

The demodulator 12 demodulates the electromagnetic signal and outputs it to the A/D converter 13. The A/D converter 13 converts the demodulated electromagnetic signal into a digital electronic signal.

When a telephone number receiving unit 38 receives from a remote device a telephone number identifying a digital still camera of the present invention through the transmitting/receiving exchanger 11, the demodulator 12 and the A/D converter 13, an answer back transmitting unit 39 outputs a first answer back signal identifying the digital still camera. The first answer back signal is transmitted to the remote device by the transmitting/receiving exchanger 11 through a second mixing unit 25, a D/A converter 26 and a modulator 27.

The telephone number receiving unit 38 automatically activates the digital still camera of the present invention to receive a transmitted signal in response to the telephone number as an electromagnetic signal generated in accordance with a wireless telephone system.

The signal from the A/D converter 13 is input to a switching unit 15 and a first distinction unit 16 respectively, after the electromagnetic signal containing a still image signal from the remote device is transmitted and is processed as described above.

The first distinction unit 16 distinguishes a still image signal from the digital electronic signal containing an audio signal and automatically switches the switching unit 15 from first mode to second mode. At the same time, the first distinction unit 16 outputs a corresponding control signal to the first inhibition unit 17.

At this time, a display device 4 indicates with characters or symbols that the device has received a still image or a still image with audio signals.

The switching unit 15 is provided to switch between a first mode and a second mode. The first mode generates a voice through speaker 3 and the second mode displays a still image on a display device 4 in response to the receiving digital signal.

The digital still camera according to the embodiment of the present invention is set in an automatic mode. In an automatic mode, the first distinction unit 16 automatically switches the switching unit 15 from first mode to the second in order to receive electromagnetic signals of a still image signal from the remote device.

The auto activating unit 19 is effective in the automatic mode for automatically activating the functions of receiving the electromagnetic signals of a still image in response to the telephone number identifying the digital still camera of the present invention when the first distinction unit 16 distinguishes the electromagnetic signals of a still image.

In a manual mode, the first distinction unit 16 does not automatically switch the switching unit 15 from the first mode to the second mode. The switching unit 15 can be activated from first mode to second mode by a manual request switch 7 in a manual mode. Also, in a manual mode, a manual switch can turn on the display device 4 and it can also switch a first mode changing unit 18 and a second mode changing unit 21 from the first mode to the second mode.

The switching unit 15 outputs the digital electronic signal from the A/D converter 13 to a memory 14 when the first inhibition unit 16 set the device in the second mode. At the same time, the first inhibition unit 17 turns off the first mode changing unit 18 to keep the speaker 3 from generating an audio signal in the second mode.

The digital electronic signal of a still image signal into the memory unit 14 by the switching unit 15 is output to a display device 4 through a second modification unit 35.

An example of talking on the phone while watching an image on display device 4 is the case where the device receives audio signals while receiving a still image at the same time. In this case, a combination of still image and audio signal is received as an electromagnetic signal generated in accordance with a wireless phone system.

When the device receives an electromagnetic signal containing a still image signal and audio signal, the first distinction unit 16 detects an audio signal and sets the switching unit 15 to the first mode. The switching unit 15 outputs the electromagnetic signal to an extracting unit 22.

From the combination signals of both a still image and an audio signal, the extracting unit 22 extracts an audio signal components to control the speaker 3 and still image signal components to control the display device 4.

At this time, the first inhibition unit 17 sets the first mode changing unit 18 "ON" and the audio signal extracted from the extracting unit 22 is input to the first mode changing unit 18 and the still image signal extracted from the extracting unit 22 is input to a memory 14. The audio signal is output to a speaker 3 through the first mode changing unit 18, and the still image signal is processed by the modification unit 35 and is displayed on display device 4.

Accordingly, the user of the digital still camera can watch a still image and hear a voice from a remote device because the display device 4 can display the still image while the speaker 3 generates the audio signal at the same time.

Following is a description of how a still image signal and an audio signal taken by the digital still camera of the present invention are transmitted to another remote device.

The user of the digital still camera designates a telephone number of a remote device, such as a wireless telephone, by activating a dial 28, which is formed as a touch panel in display device 4. The dialed telephone number is transmitted to a corresponding remote device by transmitting/receiving exchanger 11 via second mixing unit 25, D/A converter 26, and modulator 27 as an electromagnetic signal generated in accordance with a wireless phone system.

The D/A converter 26 converts digital signals corresponding to the dialed telephone number into analog signals and the modulator 27 modulates the analog signal, so that the modulated signal is transmitted to a corresponding remote device by the transmitting/receiving exchanger 11 as an electromagnetic signal generated in accordance with a wireless phone system.

The dialed telephone number is also input to the first comparator 30 and the second comparator 47.

When a user of the digital still camera speaks into the microphone 2, the microphone 2 converts the speech into electronic audio signals and the signals are input to the second mode changing unit 21. The second mode changing unit 21 outputs the electronic audio signals to the combination unit 23 and the electronic audio signals are transmitted by the transmitting/receiving exchanger 11 via the D/A converter 26 and the modulator 27.

The combination unit 23 is capable of combining a digital still image signal taken by a CCD camera while the audio signal to be transmitted. Therefore, the audio signal and the still image signal can be transmitted at the same time.

First, a still image signal taken by a CCD camera is stored in a memory 14 and the stored still image signal is output to a first modification unit 41.

The still image signal transferred to the first modification unit 41 is output to a combination unit 23 and the combination unit 23 combines the audio signals with the still image signal and output the combination according to the control of the second inhibition unit 31.

Speaking in more detail, the first comparator 30 compares the dialed telephone number with a telephone number stored in a telephone number memory 29 and outputs a comparison result to a second inhibition unit 31.

The phone number memory 29 is further capable of storing at least one telephone number of each of a first and a second type of a remote device. The first type of remote device is not able to receive a still image, and the second type of remote device is able to receive a still image.

The second inhibition unit 31 inhibits the combination unit 23 from combining the electronic audio signal with a digital still image signal from a first modification unit 41 when the dialed telephone number designating a remote device matches the telephone numbers of the first type of remote device stored in the telephone number memory 29. In this case, the second inhibition unit 31 tells the selecting unit 24 not to select and output a still image signal.

On the contrary, when the dialed telephone number designating a remote device matches the telephone number of the second type of remote device stored in the telephone number memory 29, the second inhibition unit 31 allows the combination unit 23 to combine the electronic audio signal with a digital still image signal from a first modification unit 41. In this case, the second inhibition unit 31 controls a selecting unit 24 so as to select and output a still image signal.

Thus, the combination of the electromagnetic signal containing the still image with the audio signal can be transmitted when the dialed telephone number matches the specific telephone number of the remote device having a function capable of receiving a still image signal.

However, the second inhibition unit 31 controls the combination unit 23 and the selecting unit 24 to combine an audio signal with a still image signal when an image transmitting request switch 32 is activated.

Accordingly, only when the image transmitting request switch 32 is activated or the dialed telephone number matches the telephone numbers of the second type of remote devices, the electromagnetic signal containing the still image and audio signals can be combined.

The signal containing audio signals from the microphone 2 and a still image signal taken by a CCD camera is transmitted to another remote device capable of receiving a still image signal through D/A converter 26, the modulator 27 and the transmitting/receiving exchanger 11.

As described above, the present invention, in accordance with the embodiment, provides a digital still camera capable of telecommunication including in one inseparable housing a wireless telephone, which can receive and display a digital electronic signal indicative of a still image taken by another digital still camera.

Also, the present invention provides a digital still camera that can suitably receive the audio signal and the image signal without any confusion and a user can talk not only in an ordinary manner, but also with the displayed still image being displayed and watched.

Further, the present invention provides a digital still camera that can communicate both the audio signal and the image signal at the same time and can not only communicate with various types of telephone including an ordinary one that are not capable of receiving image signals but also communicate with the same type of digital still camera with a minimum communication time.

While it has been shown and described what are at present the embodiments of the invention, it will be obvious to those skilled in the art that various changes and modifications can be readily made therein without departing from the scope and sprit of the invention as defined by the append.

What is claimed is:

1. A digital still camera capable of telecommunication comprising:

a first converting unit which converts an optical image into a digital electronic signal indicative of a still image;

a second converting unit which converts sound into an electronic signal:

a receiver which receives an electromagnetic signal transmitted through a wireless telephone network;

a modifying unit which modifies said electromagnetic signal into a digital electronic signal indicative of a still image;

a display unit which alternatively displays a still image of based on the digital electronic signal from the converting unit or from the modifying unit;

a combination unit which combines the digital electronic signal and the electronic signal to form a combination signal;

a designating unit which designates a remote device in the wireless telephone network with a specific phone number thereof;

a storage unit which stores at least one phone number; and a control unit which prevents the combination unit from combining the digital electronic signal with the electronic signal when the specific phone number of the remote device coincides with the phone number stored in the storage unit.

2. The digital still camera of claim 1, further comprising a memory which alternatively stores the digital electronic signal from the converting unit or from the modifying unit.

3. The digital still camera of claim 1, wherein the display unit includes a reflection type color liquid crystal display device.

4. The digital still camera of claim 1, further comprising an activation unit for automatically activating the receiver in response to an electromagnetic signal transmitted through the wireless telephone network and identifying the digital still camera.

5. The digital still camera of claim 1, further comprising a speaker for generating an audio signal in response to the electromagnetic signal transmitted through the wireless telephone system and received by the receiver.

6. The digital still camera of claim 5, further comprising a display control unit which controls display unit, in response to the electromagnetic signal received by the receiver, to indicate whether the received electromagnetic signal contains a still image signal or an audio signal.

7. The digital still camera of claim 5, further comprising a switching unit that switches between a first mode of generating the audio signal via the speaker in response to the electromagnetic signal received by the receiver and a second mode of displaying the image on the display unit in response to the electromagnetic signal received by the receiver.

8. The digital still camera of claim 7, further comprising for an inhibiting unit which inhibits the speaker from generating the audio signal in the second mode.

9. The digital still camera of claim 7, further comprising for distinguishing unit which distinguishes an electromagnetic signal containing a still image signal from an electromagnetic signal containing an audio signal, to automatically control the switching unit.

10. The digital still camera of claim 7, further comprising a manual control unit which allows an operator to manually control the switching unit.

11. The digital still camera of claim 5, further comprising a microphone for converting sound into an electronic audio signal, wherein the speaker and the microphone have a first mode function in which they are used with the ear and the mouth of a user respectively close thereto and a second mode function in which they are used with the ear and the mouth of a user respectively remote therefrom.

12. The digital still camera of claim 11, further comprising a manual switch for activating the display unit, wherein the speaker and the microphone are automatically changed into the second mode when the display means is activated by the manual switch.

13. The digital still camera of claim 1, wherein the first converting unit is directed toward an object located at a position where the display unit is not observable.

14. The digital still camera of claim 13, wherein the first converting unit is capable of being directed toward an object located at a position where the display unit is observable.

15. A digital still camera capable of telecommunication comprising:

a converting unit which converts an optical image into a digital electromagnetic signal indicative of a still image;

a microphone which converts sound into an electronic signal;

a combination unit which combines the digital electromagnetic signal and the electronic signal to form a combination signal;

a designation unit which designates a remote device in a wireless telephone network with a specific number thereof;

a storage unit which stores at least one phone number;

a control unit which prevents the combination unit from combining the digital electronic signal with the electric signal when the specific phone number of the remote device coincides with the phone number stored in the storage unit;

a receiver which receives an electromagnetic signal transmitted through the a wireless telephone network;

a modifying unit which modifies said electromagnetic signal into a digital electronic signal indicative of a still image;

a display unit which alternatively displays a still image based on the digital electronic signal from the converting unit or from the modifying unit;

a speaker for generating an audio signal to from the electromagnetic signal a transmitted through the wireless telephone network and received by the receiver;

a first extracting unit which extracts an audio signal component from an electromagnetic signal containing both a still image signal and an audio signal; and a second extracting unit which extracts a still image signal component from the electromagnetic signal containing both a still image signal and an audio signal, whereby the display unit is capable of displaying the still image while the audio signal is being generated from the speaker.

16. The digital still camera of claim 15, further comprising:

a transmission unit which transmits the combination signal as an electromagnetic signal through the wireless telephone network, whereby the transmission unit is capable of transmitting the digital electronic signal indicative of a still image and the audio signal separately.

17. The digital still camera of claim 16, further comprising a storage unit which stores the digital electromagnetic signal indicative of a still image from the converting unit, wherein the combination unit is combines the digital electronic signal indicative of a still image stored in the storage unit with the electronic audio signal.

18. The digital still camera of claim 16, wherein the converting unit is capable of converting the optical image into the digital electronic signal indicative of a still image while the audio signal is transmitted by the transmission unit.

19. A digital still camera capable of telecommunication comprising:

a converting unit which converts an optical image into a digital electronic signal indicative of a still image;

a microphone for converting sound into an electronic audio signal;

a selecting unit which selects one of the digital electronic signal and the electronic audio signal;

a first transmitter which transmits an electromagnetic signal through a wireless telephone network to designate a remote device having a telephone number;

a second transmitter which transmits the signal selected by the selecting unit as an electromagnetic signal a through the wireless telephone System network to the designated remote device;

a memory which stores at least one specific telephone number; and a control unit which prevents the selecting unit from selecting the digital electronic when the telephone number designating the remote device coincides with the specific telephone number.

20. A digital still camera capable of telecommunication comprising:

a converting unit which converts an optical image into a digital electronic signal indicative of a still image;

a microphone for converting sound into an electronic audio signal;

a combination unit which combines the digital electronic signal with the electronic audio signal;

a designation unit which designates a remote device in a wireless telephone network with a specific phone number thereof;

a storage unit which stores at least one phone number;

a first control unit which allows or prevents the combination unit from combining the digital electronic signal with the electronic signal when the specific phone number of the remote device coincides with the phone number stored in the storage unit;

a selecting unit which selects one of the digital electronic signal indicative of the still image and the electronic audio signal;

a transmitter which transmits the signal selected by the selecting unit as an electromagnetic signal containing the still image signal or the electronic audio signal through the wireless telephone network; and a second control unit which prevents the selecting unit from selecting the digital electronic signal indicative of the still image unless the selection is requested by a manual operation.

* * * * *